United States Patent Office 3,639,549
Patented Feb. 1, 1972

3,639,549
SHATTERED RESINS
Lewen B. O. Tugwell, Farnham, England, assignor to Shattaline Limited, Evanton, Ross and Cromarty, Scotland
No Drawing. Continuation-in-part of application Ser. No. 794,351, Jan. 27, 1969, which is a continuation-in-part of application Ser. No. 498,093, Oct. 19, 1965. This application May 14, 1970, Ser. No. 37,289
Int. Cl. B29c 25/00; C08g 51/26; C08j 1/14
U.S. Cl. 264—51
3 Claims

ABSTRACT OF THE DISCLOSURE

A method of producing a decorative body of an unsaturated polyester resin includes shaping a settable liquid mixture containing the resin and water, and allowing the mixture to set, the setting of resin generating sufficient heat to evaporate the water and thereby causing internal cracks in the set shape to give a decorative effect.

---

This application is a continuation-in-part of my copending application Ser. No. 794,351 filed Jan. 27, 1969, now abandoned which was a continuation-in-part of my application Ser. No. 498,093 filed Oct. 19, 1965.

The invention concerns improvements relating to methods of producing decorative bodies of synthetic resin material.

Settable polyester resin materials when cast in solid form may, due to the heat given out in the setting action and the contraction on cooling, form internal cracks, generally a few large cracks.

By the term "polyester" when used herein I mean the condensation product of a polycarboxylic acid and a polyol.

An object of the invention is to provide internal cracking in a controlled manner to produce a desirable and decorative shatter effect within the set resin.

I have found that a translucent decorative body of polyester resin can be produced by forming a settable liquid mixture containing a settable unsaturated polyester resin and a minor portion of water, shaping said mixture to a desired form, and allowing the mixture to set, the setting of the resin generating sufficient heat to evaporate the water and thereby cause visible internal cracks in the set shape.

The invention provides a method of producing a decorative body of a polyester resin comprising the steps of: providing a solution of a settable polyester resin of a polycarboxylic acid and a polyol, in a solvent comprising a polymerisable monomer capable of cross-linking with the polyester, forming a settable liquid mixture containing said solution and from about 0.1 to about 1.5% water by weight of polyester per se; shaping said mixture to a desired form; initiating an exothermic setting reaction; and allowing the exothermic setting reaction to proceed so that the mixture is heated by the reaction heat to a temperature above the vaporisation temperature of the water to evaporate the water and thereby provide internal cracks in the set shape, which is substantially free of surface roughness.

The water may be added as water per se, or included as the water content of another material, e.g. a colouring material.

Preferably in the settable liquid mixture from about 0.3 to about 1% by weight of polyester per se, is used.

Preferably the percentage unsaturation of the polyester resin is from about 2 to about 20% calculated as percentage, by weight of polyester per se, of doubly bound carbon.

Examples of polymerisable monomers capable of cross-linking with polyesters include styrene, methyl methacrylate, vinyl toluene and divinyl benzene.

Preferably said solution of polyester resin in styrene or other monomer comprises from about 30 to about 40% monomer by weight and from about 60 to about 70% polyester.

The styrene or other monomer serves the dual function of a solvent so that the whole product is a liquid (i.e. the polyester resin solution) suitable for casting and also as a polymerisable monomer, capable of cross-linking with the polyester.

Advantageously to the resin in liquid state there are added an accelerator, colouring material if appropriate, the appropriate quantity of water, and a hardener to initiate the setting action.

Embodiments of the invention are hereinafter described by way of example:

Apart from the presence of the water to produce the decorative shatter effect, the invention substantially follows normal polyester resin casting procedure as to ingredients, quantities, temperatures and other parameters.

Generally, for a moulding or casting operation the method involves measuring out a certain quantity of liquid settable unsaturated polyester resin, to which is added an accelerator, any appropriate colouring material, a minor proportion of water and finally a hardener. At this stage the setting action commences and the mixture is poured into a suitable mould. The mix first gells and at this stage the mass starts to generate its own heat by chemical reaction; some external heating may be employed to help initiate the setting action but this is very small in relation to the heat generated by the chemical reaction. The mix then hardens and almost immediately the temperature reaches the vaporisation point of the water and the resin commences a visible internal cracking or shatter effect due to a vaporising action of the water within the resin, the vaporisation point of the water being less than the maximum temperature reached during the setting action.

The amount of cracking and the size of the cracks depends on the quantity of water added to a specific quantity of resin within the numerical limits specified hereinabove. If too little water is used there will be insufficient shatter produced; too much water will produce too much shatter and spoil the decorative effect of the article.

Other factors in relation to the degree of cracking are the initial temperature of the resin on pouring into the mould and the extent to which the mould is externally heated to help initiate the exothermic reaction. Too much external heating and there will be too much shatter; too little and there will be insufficient shatter and the exothermic reaction may even not proceed rapidly enough in relation to ambient cooling, to reach the necessary temperature of at least the vaporisation point of the water. The initial temperature of the resin and the degree of external heating required to produce a given shatter effect vary according to the nature of the article to be cast. Small articles require more external heating and a higher initial resin temperature than large articles because of the greater effect of ambient cooling. With the largest sizes no external mould heating at all may be required. The initial temperature of the resin mixture at which it is poured into the mould should generally be at least 55° F. and is, according to the size of the article and the degree of shatter required, for example between 65° F. and 140° F. more usually between 75° F. and 100° F. Following pouring the mould is, if necessary, heated in an oven to maintain the temperature of the resin for a sufficient time to establish an exothermic reaction which will achieve a temperature of at least the vaporisation point of the water and the required degree of shatter. The time for this external heating of the mould is for example from about 3 to about 20 minutes again according to the size of the article and the degree of shatter required. The total time for completion of the setting is for example between 3 minutes and 2 hours.

As the setting action commences, the material in the mould contracts slightly and water escapes all round the surface of the material through those cracks which extend to the surface. Water in the form of water vapor escaping from the article as it is molded, is removed from the mold through a conventional open end thereof or through conventional vents thereof. However, surprisingly the set shape is substantially free of surface roughness and no surface roughness is caused by the escaping water vapour in areas which are adjacent the mould surfaces; any slight surface roughness in the area not adjacent the mould surfaces (i.e. adjacent the pouring inlet of the mould) may afterwards be sanded and polished; it is emphasized that no polishing is required in those surface areas which are formed adjacent the mould surfaces. No special control of the water vaporisation is required beyond the fixing of the initial conditions including water content, initial resin temperature and external heating (if any) so that sufficient, but not excessive shatter is produced.

On completion of the setting action the completed article is removed from the mould.

The shatter effect produced within the set resin forms numerous internal reflective surfaces imparting to the body a desirable decorative effect. The surface of the body however is quite smooth and as stated there is no surface roughness, although occasional cracks may extend to the surface of the body.

The method is applicable to the production of translucent bodies of any form, size or shape, solid or hollow, for example panels or screens such as fire screens, windows for private houses, public buildings and churches, articles such as tiles, table tops, table lamp standards, paperweights and other decorative objects, or bodies of block, rod, bar or other form for subsequent manufacture into articles.

In many applications, special translucent colouring materials may be added to the resins used to heighten the decorative effect. Such colouring materials do not normally have any water content. However, in accordance with the invention other colouring materials not normally used for colouring resins, e.g. Indian ink, may be used having a water content which provides or in part provides the water addition to produce the desired shatter effect.

Polyester resins which may be employed in the invention may be for example:

(a) A polyester resin prepared by mixing 3 moles of maleic anhydride with 1 mole of sebacic acid and 4 moles of diethylene glycol and heating the well-stirred mixture under carbon dioxide for 6 hours at 200° C. Acid value of the resin is 30 to 40 mg. KOH/gm.

(b) A polyester resin prepared by mixing 1 mole of maleic anhydride, 1 mole of phthalic anhydride and 2.2 moles of 1,2-propylene glycol and heating at 200° C. Acid value of the resin is 30–40 mg. KOH/gm.

(c) A polyester resin prepared by mixing 1 mole of fumaric acid, 1 mole of phthalic acid and 2.2 moles of 1,2-propylene glycol and heating at 200° C. for 4 to 6 hours. Acid value of the resin is 35 mg. KOH/gm.

The percentage unsaturations of these polyester resins are as follows: (a) 8%, (b) 6%, (c) 5.5%.

The following examples will serve to illustrate the invention. In these examples use was made of polyester resin (b) described hereinabove dissolved in styrene to which had been previously added 0.03% by weight of hydroquinone as inhibitor the relative proportions of polyester resin to styrene being 2:1 by weight.

EXAMPLE I

For a table lamp standard (of approximate dimensions 11" x 3½" x 3½") a typical pouring will involve 5 lbs. of the solution of unsaturated polyester resin (b) in styrene, 30 ccs. of accelerator e.g. a cobalt naphthenate accelerator, a small quantity of translucent resin colouring pigment, 15 ccs. of water and finally 40 ccs. of hardener, e.g. a peroxide hardener such as methyl ethyl ketone peroxide or cyclohexanone peroxide. The interior shatter is generally made up of small planes of interior cracking of maximum dimensions from about ¾" to 1¼". In this case the initial temperature of the poured mixture was 75° F. and no external heating was required.

A mix of similar proportions to give a similar shatter size is suitable for other articles, e.g. paperweights, although the total quantities will, of course, be more or less according to the size of the moulding.

EXAMPLE II

For a thin tile (of dimensions 9" x 9" x ½"), 2 lbs. of solution of unsaturated polyester resin (b) in styrene, 8 ccs. of accelerator, colouring pigment to suit, 4 ccs. of water and then 15 ccs. of hardener will give a size of cracking planes of maximum dimensions of about ¾". In this case the initial temperature was 100° F. and the mould was externally heated for 5 minutes to maintain this temperature and held initiate the exothermic reaction.

A mix of similar proportions to give a similar shatter size is suitable for other articles.

EXAMPLE III

For a table top (of dimensions 18" x 14" x 1½"), 14 lbs. of the solution of unsaturated polyester resin (b) in styrene, 80 ccs. of accelerator, pigment to suit, 42 ccs. of water and 112 ccs. of hardener will give planes of cracking of maximum dimensions ranging from about 1¼" up to 3", within places larger planes of shatter of maximum dimensions about 6" to 8". Again the initial temperature was 75° F. and no external heating was required.

A mix of similar proportions to give comparable shatter effect is suitable for other articles, e.g. for a large decorative screen or window.

It has been found that without the addition of water or with the addition of other forms of liquids, the shatter effect is not obtained, although there may be some limited and probable undesirable cracking effect principally due to internal stresses in the self healing and cooling action on setting as indicated above. No liquid has been found to give anything resembling the same desirable shatter effect as is obtained with the water addition of the invention.

This shatter effect consists of numerous reflective planes of cracking of varying dimensions as described giving a desirable visual effect in the finished article, and is not to be confused with the well known plastic foaming techniques which involve a quite different effect.

I claim:

1. A method of producing a decorative body of a polyester resin comprising the steps of:
    providing a solution of a settable polyester resin of a polycarboxylic acid and a polyol, in a solvent comprising a polymerisable monomer capable of crosslinking with the polyester,
    forming a settable liquid mixture containing said solution and from about 0.1 to about 1.5% water by weight of polyester per se;
    shaping said mixture to a desired form;
    initiating an exothermic setting reaction; and
    allowing the exothermic setting reaction to proceed so that the mixture is heated by the reaction heat to a temperature above the vaporisation temperature of the water to evaporate the water and thereby provide internal cracks in the set shape, which is substantially free of surface roughness.

2. A method of producing a translucent decorative body of a polyester resin comprising the steps of:

providing a solution in styrene of a settable unsaturated polyester resin of a polycarboxylic acid and a polyol and having from about 2 to about 20% by weight thereof of doubly bound carbon, the solution comprising from about 30 to about 40% styrene by weight and from about 60 to about 70% unsaturated polyester;

forming a settable liquid mixture containing said solution and from about 0.3 to about 1% water by weight of polyester per se.

shaping said mixture to a desired form;

initiating an exothermic setting reaction at an initial temperature of at least 55° F.; and allowing the exothermic setting reaction to proceed so that the mixture is heated by the reaction heat to a temperature above the vaporisation temperature of the water to evaporate the water and thereby provide internal cracks in the set shape, which is substantially free of surface roughness.

3. A method according to claim 2, wherein the settable mixture is poured into a mould at a temperature from about 75° F. to about 100° F. and the mould is externally heated to maintain the temperature of the mixture for a period from about 3 minutes to about 20 minutes.

References Cited
UNITED STATES PATENTS

| 2,238,446 | 4/1941 | Kuettel | 264—331 |
| 2,243,369 | 5/1941 | Albert | 264—331 |
| 2,861,009 | 11/1958 | Rubner | 117—38 |
| 2,969,301 | 1/1961 | Finger | 117—41 |
| 3,257,491 | 6/1966 | Smits | 264—331 |
| 3,379,658 | 4/1968 | Kemper | 264—49 |

ROBERT F. WHITE, Primary Examiner

J. R. THURLOW, Assistant Examiner

U.S. Cl. X.R.

260—29.2; 264—236, 331